United States Patent
Del Gaizo et al.

(10) Patent No.: US 10,166,859 B1
(45) Date of Patent: Jan. 1, 2019

(54) ACTIVE UNDERBODY ARRANGEMENT FOR A VEHICLE

(71) Applicant: GM GLOBAL TECHNOLOGY OPERATIONS LLC, Detroit, MI (US)

(72) Inventors: Steven A. Del Gaizo, Madison Heights, MI (US); William Fang, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 25 days.

(21) Appl. No.: 15/638,896

(22) Filed: Jun. 30, 2017

(51) Int. Cl.
| | | |
|---|---|---|
| *B60K 11/08* | (2006.01) | |
| *B60K 11/04* | (2006.01) | |
| *B62D 37/02* | (2006.01) | |
| *B62D 35/02* | (2006.01) | |
| *F01P 3/20* | (2006.01) | |

(52) U.S. Cl.
CPC ............ *B60K 11/085* (2013.01); *B60K 11/04* (2013.01); *B62D 35/02* (2013.01); *B62D 37/02* (2013.01); *F01P 3/20* (2013.01)

(58) Field of Classification Search
USPC ....................................................... 180/68.1
See application file for complete search history.

(56) References Cited

U.S. PATENT DOCUMENTS

| | | | | |
|---|---|---|---|---|
| 4,805,747 A * | 2/1989 | Moedinger | ............ | F16D 65/847 188/264 A |
| 4,924,826 A * | 5/1990 | Vinson | .................. | F01P 7/12 123/195 C |
| 4,938,303 A * | 7/1990 | Schaal | ................. | B60H 1/3227 123/41.48 |
| 4,976,489 A * | 12/1990 | Lovelace | ............ | B62D 35/005 296/180.1 |
| 4,995,447 A * | 2/1991 | Weidmann | ............. | B60K 11/08 123/41.33 |
| 5,193,608 A * | 3/1993 | Sekine | ................... | B60K 11/08 123/41.49 |
| 6,427,798 B1 * | 8/2002 | Imashige | ................ | E02F 3/325 123/41.31 |
| 6,588,380 B2 * | 7/2003 | Ries-Mueller | ............ | F01P 7/12 123/41.05 |
| 6,854,544 B2 * | 2/2005 | Vide | .................... | B60K 11/085 180/68.1 |
| 8,292,014 B2 * | 10/2012 | Sugiyama | ............ | B60K 11/085 123/41.06 |

(Continued)

*Primary Examiner* — Jeffrey J Restifo
(74) *Attorney, Agent, or Firm* — Quinn IP Law (57) ABSTRACT

A vehicle includes a vehicle body having a first end configured to face oncoming airflow when the vehicle is in motion relative to a road surface and an opposing second end and an under-hood compartment provided in the first end of the vehicle body. An underbody extends between the first and second ends of the vehicle body and defines a space between the vehicle body and the road surface. At least one aerodynamic member is disposed adjacent a forward portion of the underbody and proximate to the under-hood compartment. The at least one aerodynamic member includes a housing and an airflow management device provided in an opening in the housing. The airflow management device is selectively positioned to direct the airflow from the front end of the vehicle into the under-hood compartment to improve vehicle performance.

20 Claims, 2 Drawing Sheets

(56) References Cited

U.S. PATENT DOCUMENTS

| | | | | |
|---|---|---|---|---|
| 8,302,714 B2* | 11/2012 | Charnesky | B60K 11/085 | 180/68.1 |
| 8,316,974 B2* | 11/2012 | Coel | B60K 11/085 | 165/44 |
| 8,443,921 B2* | 5/2013 | Charnesky | F01P 7/10 | 180/68.1 |
| 8,469,128 B2* | 6/2013 | Van Buren | B60K 11/085 | 165/44 |
| 8,517,130 B2* | 8/2013 | Sakai | B60K 11/085 | 180/68.1 |
| 8,544,583 B2* | 10/2013 | Ajisaka | B60K 11/08 | 180/68.1 |
| 8,561,738 B2* | 10/2013 | Charnesky | B60K 11/085 | 180/68.1 |
| 8,645,028 B2* | 2/2014 | Mochizuki | B60K 11/085 | 123/41.05 |
| 8,646,552 B2* | 2/2014 | Evans | B60K 11/085 | 180/68.1 |
| 8,672,067 B2* | 3/2014 | Ajisaka | B60H 1/00535 | 165/41 |
| 8,689,917 B2* | 4/2014 | Miesterfeld | F01P 7/10 | 180/68.1 |
| 8,708,075 B2* | 4/2014 | Maurer | B60R 19/52 | 180/68.1 |
| 8,708,077 B2* | 4/2014 | Hori | B60K 11/085 | 180/68.1 |
| 8,739,744 B2* | 6/2014 | Charnesky | B60K 11/085 | 123/41.04 |
| 8,752,660 B2* | 6/2014 | Ajisaka | B60K 11/04 | 180/291 |
| 8,763,738 B2* | 7/2014 | Missig | B62D 25/084 | 180/68.1 |
| 8,794,360 B2* | 8/2014 | Nemoto | B60K 11/085 | 180/68.1 |
| 8,794,363 B2* | 8/2014 | Wolf | B60K 11/085 | 180/68.1 |
| 8,814,638 B2* | 8/2014 | Hasegawa | B60K 11/085 | 123/41.05 |
| 8,820,451 B2* | 9/2014 | Matsumoto | B60K 1/04 | 180/65.1 |
| 8,825,308 B2* | 9/2014 | Nishimura | B60H 1/3208 | 180/68.1 |
| 8,833,498 B2* | 9/2014 | Charnesky | F01P 7/10 | 180/68.1 |
| 8,915,320 B2* | 12/2014 | Chinta | B60K 11/085 | 180/68.1 |
| 8,919,470 B2* | 12/2014 | Hori | B60K 11/085 | 180/68.1 |
| 8,936,121 B2* | 1/2015 | Vacca | B60K 11/04 | 165/44 |
| 8,955,628 B2* | 2/2015 | Murray | B60K 11/08 | 180/68.1 |
| 8,967,308 B2* | 3/2015 | Saito | B60K 11/085 | 180/68.1 |
| 8,983,735 B2* | 3/2015 | Konishi | B60K 11/085 | 123/41.04 |
| 8,983,736 B2* | 3/2015 | Hirota | B60K 11/085 | 123/41.04 |
| 9,188,052 B2* | 11/2015 | Tajima | B60K 11/04 | |
| 9,440,555 B2* | 9/2016 | Garfinkel | B60L 11/1874 | |
| 9,599,050 B2* | 3/2017 | Sugimoto | F01P 11/14 | |
| 9,714,602 B2* | 7/2017 | Maurer | F01P 7/10 | |
| 9,738,176 B2* | 8/2017 | Garfinkel | B60L 11/1874 | |
| 9,770,973 B1* | 9/2017 | Vaddiraju | B60K 11/08 | |
| 9,802,475 B2* | 10/2017 | Wolf | B60K 11/085 | |
| 2011/0284298 A1* | 11/2011 | Ajisaka | B60H 1/00535 | 180/65.21 |
| 2012/0153681 A1* | 6/2012 | Ajisaka | B60K 11/04 | 296/208 |

* cited by examiner

PRIOR ART

ACTIVE UNDERBODY ARRANGEMENT FOR A VEHICLE

INTRODUCTION

The present disclosure relates to an active underbody arrangement for a vehicle.

Vehicle aerodynamic properties may be adjusted to both improve and reduce operational functions of the vehicle. For example, adjusting vehicle aerodynamics may reduce drag and wind noise while minimizing noise emission during vehicle operation. Adjusting vehicle aerodynamics may also be used to achieve downforce and improve vehicle traction and cornering abilities.

Vehicles frequently employ ambient airflow for cooling powertrain components situated in an under-hood compartment. Ambient airflow typically enters the under-hood compartment through a grille opening strategically positioned in a high pressure area on the vehicle body. A baseline or minimum airflow admitted into the vehicle's under-hood compartment through the grille opening is generally determined in response to the minimum cooling requirements of the subject powertrain. In turn, the minimum cooling required by a specific powertrain is typically influenced by such factors as the aerodynamics, mass, intended use, and actual duty cycle of the subject vehicle, as well as the power output of the vehicle's engine.

SUMMARY

A vehicle includes a vehicle body having a first end and an opposing second end. The first end of the vehicle is configured to face oncoming airflow when the vehicle is in motion relative to a road surface. An under-hood compartment is provided in the first end of the vehicle body. An underbody extends between the first and second ends of the vehicle body. The underbody defines a space between the vehicle body and the road surface and includes a first lateral edge, an opposing second lateral edge and a central region defined therebetween. The underbody includes a forward portion adjacent the first end of the vehicle body, a rearward portion adjacent the second end of the vehicle body and a central portion extending therebetween.

At least one aerodynamic member is disposed adjacent the forward portion of the underbody and proximate to the under-hood compartment. The at least one aerodynamic member includes a housing and an airflow management device provided in an opening in the housing. The airflow management device is selectively positioned to direct the airflow from the front end of the vehicle into the under-hood compartment to improve vehicle performance.

The airflow management device of the at least one aerodynamic member includes a shutter assembly disposed in the opening in the housing of the at least one aerodynamic member. The shutter assembly includes one or more louvers selectively positioned to control a size of the opening of the housing between at least a fully open position and a fully closed position. A mechanism is operatively connected to the shutter assembly of the airflow management device. The mechanism is configured to selectively position the shutter assembly between at least the fully open position and the fully closed position. A controller is operatively connected to the mechanism to regulate movement of the mechanism.

The vehicle further includes at least one grille opening provided in the first end of the vehicle body and cooperating with the under-hood compartment to receive the airflow. A shutter assembly is arranged proximate to the at least one grille opening. The shutter assembly includes one or more louvers selectively positioned to control a size of the at least one grille opening between at least a fully open position and a fully closed position. A mechanism is operatively connected to the shutter assembly cooperating with the at least one grille opening and is configured to position the shutter assembly between at least the fully open position and the fully closed position.

In one non-limiting embodiment of the disclosure, the mechanism is operatively connected to the shutter assembly cooperating with the at least one grille opening and is operatively connected to the shutter assembly of the airflow management device. The vehicle includes an internal combustion engine received in the under-hood compartment and a heat exchanger in fluid communication with the engine. The engine is cooled by a liquid circulated through the heat exchanger. A controller is operatively connected to the mechanism to regulate movement of the mechanism. The controller is configured to selectively position the shutter assembly of the airflow management device between at least the fully open position and the fully closed position to cool the liquid circulated through the heat exchanger based upon a load on the engine.

In another embodiment of the disclosure, a system for adjusting airflow into an under-hood compartment is provided in a body of a vehicle. The system includes at least one aerodynamic member disposed proximate the under-hood compartment. The at least one aerodynamic member includes a housing and an opening extending at least partially through the housing. An airflow management device is provided in the opening in the housing. The airflow management devices is selectively positioned to direct the airflow into the under-hood compartment to improve vehicle performance.

A mechanism is operatively connected to the airflow management device and is configured to selectively position the airflow management device between at least a fully open position and a fully closed position. A controller is operatively connected to the mechanism to regulate movement of the mechanism.

The airflow management device of the at least one aerodynamic member includes a shutter assembly disposed in the opening in the housing of the at least one aerodynamic member. The shutter assembly includes one or more louvers selectively positioned to control a size of the opening of the housing between at least the fully open position and the fully closed position.

The system further includes at least one grille opening provided in the first end of the vehicle body and cooperating with the under-hood compartment to receive the airflow. A shutter assembly is arranged proximate to the at least one grille opening. The shutter assembly includes one or more louvers selectively positioned to control a size of the at least one grille opening between at least a fully open position and a fully closed position. A mechanism is operatively connected to the shutter assembly cooperating with the at least one grille opening and is configured to position the shutter assembly between at least the fully open position and the fully closed position.

In one non-limiting embodiment of the disclosure, the mechanism is operatively connected to the shutter assembly cooperating with the at least one grille opening and is operatively connected to the shutter assembly of the airflow management device. The system includes an internal combustion engine received in the under-hood compartment and a heat exchanger in fluid communication with the engine. The engine is cooled by a liquid circulated through the heat exchanger. A controller is operatively connected to the mechanism to regulate movement of the mechanism. The controller is configured to selectively position the shutter assembly of the airflow management device between at least the fully open position and the fully closed position to cool the liquid circulated through the heat exchanger based upon a load on the engine.

In yet another embodiment of the disclosure, a vehicle includes a vehicle body having a first end and an opposing second end. The first end of the vehicle is configured to face oncoming airflow when the vehicle is in motion relative to a road surface. An under-hood compartment is provided in the first end of the vehicle body. An internal combustion engine is received in the under-hood compartment. A heat exchanger is in fluid communication with the engine. The engine is cooled by a liquid circulated through the heat exchanger.

An underbody extends between the first and second ends of the vehicle body. The underbody defines a space between the vehicle body and the road surface and includes a first lateral edge, an opposing second lateral edge and a central region defined therebetween. The underbody includes a forward portion adjacent the first end of the vehicle body, a rearward portion adjacent the second end of the vehicle body and a central portion extending therebetween.

At least one grille opening is provided in the first end of the vehicle body and cooperating with the under-hood compartment to receive the airflow. A shutter assembly is arranged proximate to the at least one grille opening. The shutter assembly includes one or more louvers selectively positioned to control a size of the at least one grille opening between at least a fully open position and a fully closed position.

At least one aerodynamic member is disposed adjacent the forward portion of the underbody and proximate to the under-hood compartment. The at least one aerodynamic member includes a housing and an airflow management device provided in an opening in the housing. The airflow management device of the at least one aerodynamic member includes a shutter assembly disposed in the opening in the housing of the at least one aerodynamic member. The shutter assembly includes one or more louvers selectively positioned to control a size of the opening of the housing between at least a fully open position and a fully closed position. The shutter assembly is arranged proximate to the at least one grille opening and the shutter assembly disposed in the opening of the housing are selectively positioned to direct the airflow from the front end of the vehicle into the under-hood compartment to improve vehicle performance.

In one non-limiting embodiment of the disclosure, the mechanism is operatively connected to the shutter assembly cooperating with the at least one grille opening and is operatively connected to the shutter assembly of the airflow management device to selectively position the shutter assemblies between at least the fully open positions and the fully closed positions. A controller is operatively connected to the mechanism to regulate movement of the mechanism. The controller is configured to selectively position the shutter assembly of the airflow management device between at least the fully open position and the fully closed position to cool the liquid circulated through the heat exchanger based upon a load on the engine.

The above features and advantages and other features and advantages of the present disclosure are readily apparent from the following detailed description of the best modes for carrying out the disclosure when taken in connection with the accompanying drawings.

DETAILED DESCRIPTION

Reference will now be made in detail to several embodiments of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity, directional terms such as top, bottom, left, right, up, over, above, below, beneath, rear, and front, may be used with respect to the drawings. These and similar directional terms are not to be construed to limit the scope of the disclosure.

Figure 1:
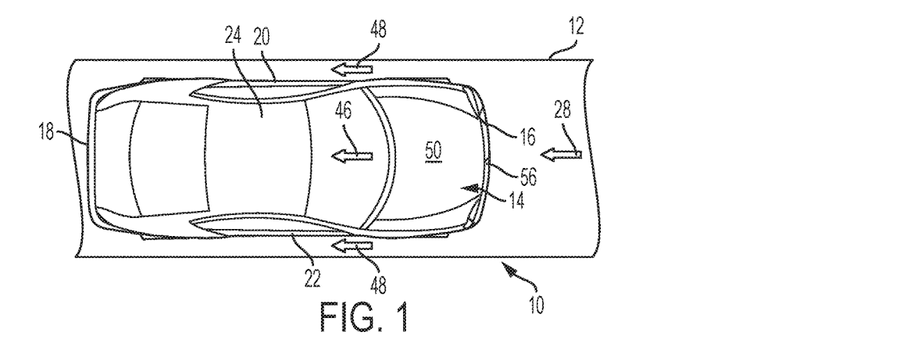
FIG. 1 is a top view of a vehicle having an aerodynamic underbody arrangement in accordance with the present disclosure.

Referring to the drawings, wherein like reference numbers correspond to like or similar components throughout the several Figures, an example vehicle 10 is shown schematically in FIG. 1. The vehicle 10 may include, but not be limited to, a commercial vehicle, industrial vehicle, passenger vehicle, aircraft, watercraft, train or any mobile platform. It is also contemplated that the vehicle may be any mobile platform, such as an airplane, all-terrain vehicle (ATV), boat, personal movement apparatus, robot and the like to accomplish the purposes of this disclosure.

Figure 2:
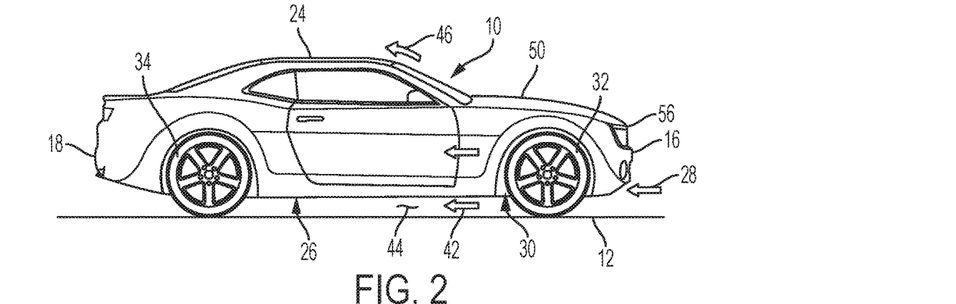
FIG. 2 is a side view of the vehicle shown in FIG. 1.

The vehicle 10 in FIG. 1 is positioned relative to a road surface 12. The vehicle 10 includes a vehicle body 14. The vehicle body 14 illustrated in the Figures defines six body sides. The six body sides include a first end or front end 16, an opposing second end or rear end 18, a first lateral portion or left side 20 generally extending between the first and second ends 16, 18, and an opposing second lateral portion or right side 22. The vehicle body 14 further includes a top body portion 24, which may include at least a vehicle roof portion, and an opposing lower body portion or underbody 26 as shown in FIG. 2. As understood by those skilled in the art, the first or front end 16 may be configured to face oncoming ambient airflow 28 when the vehicle 10 is in motion relative to the road surface 12.

The vehicle 10 includes a frame 30 cooperating with and supporting the vehicle body 14. The frame 30 supports a first set of one or more wheels 32 disposed adjacent the first or front end 16 of the vehicle 10 and a second set of one or more wheels 34 disposed adjacent the second or rear end 18 of the vehicle 10. As shown in FIG. 1, the first set of one or more wheels 32 includes a pair of front wheels that are rotatably connected to the frame 30 and rotate about an axis while the second set of one or more wheels 34 includes a pair of rear wheels that are rotatably connected to the frame 30 and rotate about an axis. The underbody 26 may generally extend or span a distance 30 between the first and second ends 16, 18 of the vehicle body.

The underbody 26 of the vehicle 10 may be defined by one or more regions extending between the first or front end 16 and second or rear body end 18. A forward underbody portion 36 may be defined as an area of the underbody 26 generally extending between the first or front end 16 of the body 14 and the one or more front wheels 32. A rearward underbody portion 38 may be defined as an area of the underbody 26 generally extending between the one or more rear wheels 34 and the second or rear end 18 of the body 14. A central underbody portion 40 may be defined as an area of the underbody 26 between the forward underbody portion 36 and rearward underbody portion 38. It is understood that the underbody regions described herein may also be configured in alternative configurations based upon the configuration of the vehicle 10.

The underbody 26 may include a substantially flat surface portion. A first airflow portion 42 may flow past the vehicle body 14 with limited disturbance. The underbody 26 may also define a space 44 between the vehicle body 14 and the road surface 12. Accordingly, the space 44 permits the first airflow portion 42 to pass under the vehicle body 14, between the vehicle body 14 and the road surface 12, while a second airflow portion 46 passes over the top body portion 24. Furthermore, a third airflow portion 48 passes around the left and right sides 20, 22 of the vehicle body 14. As is illustrated in FIG. 1, the first airflow portion 42 travels or passes beneath the underbody 26 of the vehicle through the space 44 between the road surface 12 and the vehicle 10

Figure 3:
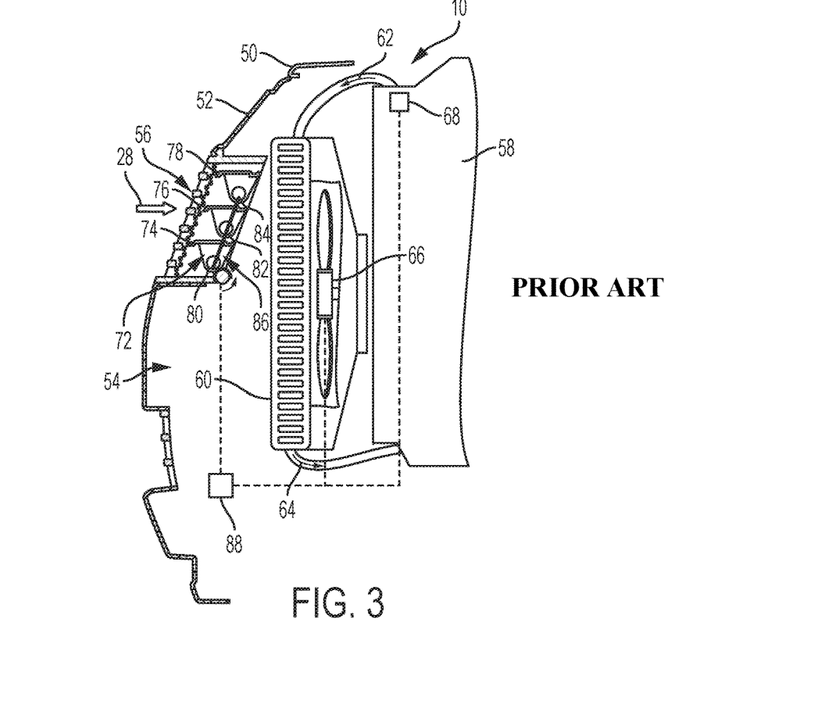
FIG. 3 is a partial side cross-sectional view of the vehicle having a shutter system, with the shutter system depicted in a fully opened state.

FIG. 3 shows a partial side view of a vehicle 10. The vehicle 10 includes a hood 50 configured to cover a portion 52 of the first end 14 to thereby define an under-hood compartment 54. The vehicle 10 is shown to include at least one grille opening 56 typically covered with a mesh and configured for receiving ambient air.

The under-hood compartment 54 of the vehicle 10 may be configured to accept a number of alternative distinct powertrains. A specific powertrain may be selected based on the intended use of the vehicle 10 or the general preference of the vehicle's user. Accordingly, during the initial design of the vehicle 10, the under-hood compartment 54 is typically configured to accommodate each of the alternative powertrains. Hence, although the physical size of the alternative powertrains, as well as the power output of the respective engines, may be vastly different, the overall size and layout of the particular under-hood compartment 54 remains relatively unchanged.

Generally, openings that are in the front end 16 of the vehicle 10, such as the grille openings 56, as well as various protruding features on the surface of the vehicle body 14, tend to impact the vehicle's aerodynamic signature. Accordingly, it is typically beneficial to minimize the size of such openings 56 whenever additional airflow into the under-hood compartment 54 is not required. Although one grille opening 56 is depicted and described, nothing precludes the vehicle 10 from having a greater number of grille openings for admitting the ambient airflow 28 into the under-hood compartment 54 from the ambient atmosphere.

The vehicle 10 additionally includes a powertrain that is specifically represented by an internal combustion engine 58. The powertrain of the vehicle 10 may additionally include a transmission, and, if the vehicle is a hybrid type, one or more motor-generators, none of which is shown, but the existence of which can be appreciated by those skilled in the art. Efficiency of a vehicle powertrain is generally influenced by its design, as well as by the various loads the powertrain sees during its operation.

The vehicle 10 additionally includes an air-to-fluid heat exchanger 60, as known as a radiator, for circulating a cooling fluid shown by arrows 62 and 64, such as water or a specially formulated coolant, through the engine 58 to remove heat from the engine. A high-temperature coolant entering the heat exchanger 60 is represented by the arrow 62, and a reduced-temperature coolant being returned to the engine is represented by the arrow 64. Typically, the coolant is continuously circulated by a fluid pump (not shown) between the engine 58 and the heat exchanger 60.

As shown in FIG. 3, the heat exchanger 60 is positioned behind the at least one grille opening 56 that may be covered by a mesh (not shown) for protection of the heat exchanger 60 from various road and air-borne debris. Although the heat exchanger 60 is shown as being positioned at the front of the vehicle 10, i.e., adjacent or proximate to the first end 14, the heat exchanger may also be positioned in a different location, such as behind a passenger compartment 38. Positioning the heat exchanger 60 behind the passenger compartment 38 may be advantageous, if, for example, the vehicle has a rear or a mid-engine configuration.

Although a single heat exchanger 60 is depicted, nothing precludes any number of heat exchangers being arranged side by side or in a series for cooling several vehicle systems or components, such as the transmission. Both the engine 58 and heat exchanger 60 may be mounted in the under-hood compartment 54 where they can be accessed by the airflow. As shown, after being admitted through the grille opening 56, the airflow 28 is passed through the heat exchanger 60.

A fan 66 is positioned in the vehicle 10, behind the heat exchanger 60, such that the heat exchanger 60 is positioned between the grille opening 56 and the fan 66. The fan 66 may be driven either electrically by an electric motor (not shown) or mechanically by the engine 58. The fan 66 is capable of being selectively turned on and off based on the cooling needs of the engine 58. Depending on the road speed of the vehicle 10, the fan 66 is adapted to either generate or enhance a flow of ambient air or airflow 28 through the grille opening 56 toward and through the heat exchanger 60.

Once generated or enhanced through the action of the fan 66, the airflow 28 is passed through the heat exchanger 60 to remove heat from the high-temperature coolant 62 before the reduced-temperature coolant 64 is returned to the engine 58. The vehicle 10 additionally includes a coolant sensor 68 configured to sense a temperature of the high-temperature coolant 62 as it exits the engine 58.

In one non-limiting embodiment of the disclosure, the vehicle 10 may include a shutter system 70 cooperating with the at least one grille opening 56. The shutter system 70 may including a rotatable or adjustable shutter assembly 72. The shutter assembly 72 is secured in the vehicle 10 and is adapted to regulate an amount of the airflow 28 entering or flowing into the vehicle through the grille opening 56. As shown, the shutter assembly 72 is positioned behind, and immediately adjacent to the at least one grille opening 56 at the front of the vehicle 10. As shown, the shutter assembly 72 is positioned between the grille opening 56 and the heat exchanger 16. The shutter assembly 72 may also be incorporated into and be integral with the grille opening 56. The shutter assembly 72 includes a plurality of louvers, herein shown as having three individual louver elements 74, 76, and 78, but the number of louvers may either be fewer or greater.

Each louver 74, 76, and 78 may be configured to rotate about a respective pivot axis 80, 82, and 84 during operation of the shutter assembly 72, thereby effectively controlling the size of the grille opening 56 and the amount of ambient airflow 28 into the vehicle 10. The shutter assembly 72 is adapted to operate between and inclusive of at least a fully-closed position or state (not shown), through an intermediate or partially-closed position and to a fully-opened position as shown in FIG. 3. When the louver elements 74, 76, and 78 are in any of their open positions, the airflow 28 enters the vehicle 10 by penetrating the plane of shutter assembly 72 before encountering the heat exchanger 60.

The shutter system 70 may also include a mechanism 86 operatively connected to the shutter assembly 72 configured to adjust the shutter assembly 72, and thereby selectively position of the shutter assembly 72 between and inclusive of fully-opened and fully-closed. The mechanism 86 may be configured to cause the louvers 74, 76, 78 to rotate in tandem or substantially in unison, and permitting the shutter assembly 72 to rotate into any of the available positions. The mechanism 86 may be adapted to select and lock either discrete intermediate positions of the louvers 74-78 or to infinitely vary position of the louvers between and inclusive of the fully-opened and fully-closed. The mechanism 86 acts to select the desired position for the shutter assembly 72 when activated by any external means, as understood by those skilled in the art, such as an electric motor or the like.

The vehicle 10 also includes a controller 88, which may be an engine controller or a separate control unit, operatively connected to the mechanism 86 to regulate movement of the mechanism 86 to selectively position the shutter assembly 72. The controller 88 may also be configured to operate the fan 66, if the fan is electrically driven, and a thermostat (not shown) that is configured to regulate the circulation of coolant, as understood by those skilled in the art.

The controller 88 may be programmed to operate the mechanism 86 according to a load on the engine 14 and, correspondingly, to the temperature of the coolant sensed by the sensor 68. The temperature of the high-temperature coolant 62 is increased due to the heat produced by the engine 58 under load. As known by those skilled in the art, a load on the engine 58 is typically dependent on operating conditions imposed on the vehicle 10, such as going up a hill and/or pulling a trailer. The load on the engine 58 generally drives up the internal temperature of the engine, which in turn necessitates cooling of the engine for desired performance and reliability. Typically, the coolant is continuously circulated by a fluid pump (not shown) between the engine 58 and the heat exchanger 60.

Figure 4:
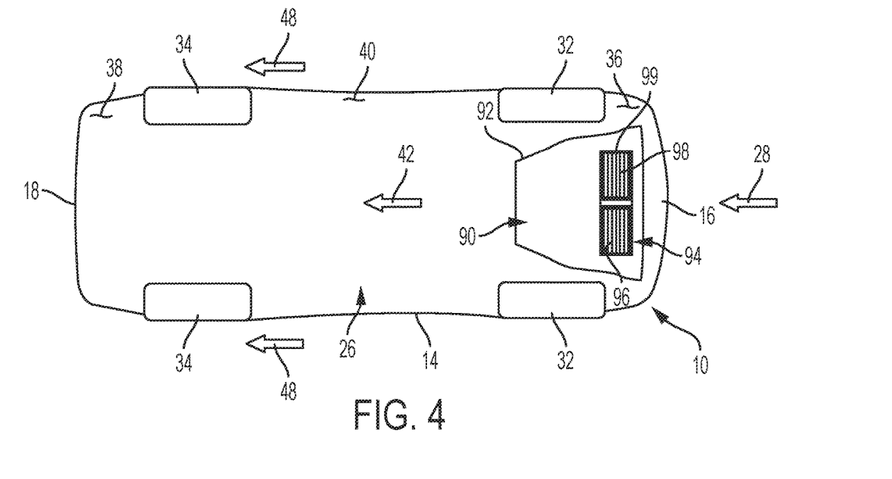
FIG. 4 is a bottom view of the underbody of the vehicle shown in FIG. 1 incorporating at least one aerodynamic member in accordance with the present disclosure.
Figure 5:
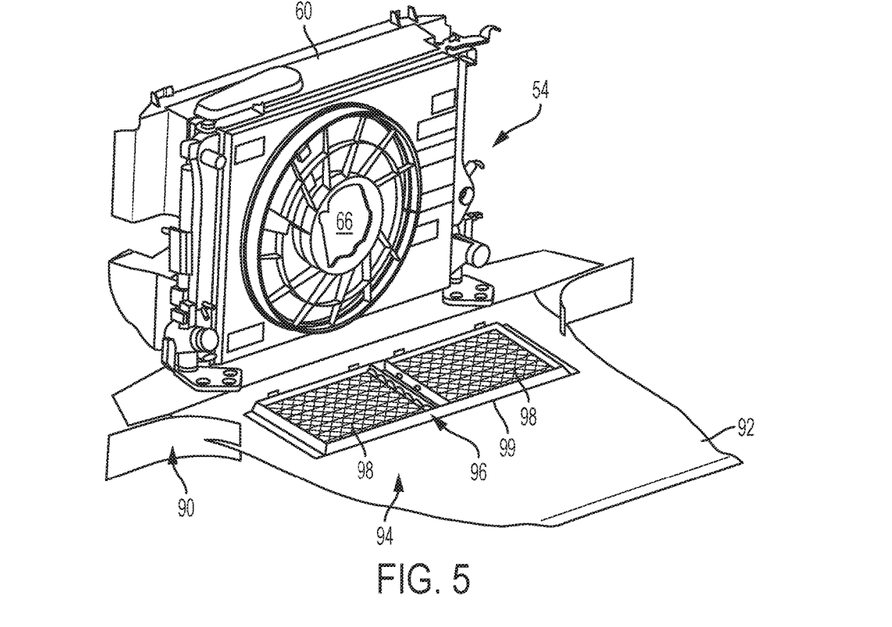
FIG. 5 is a perspective view of the vehicle cooling system cooperating with the at least one aerodynamic member in accordance with the present disclosure.

Referring now to FIGS. 4 and 5, a modified underbody arrangement for the vehicle 10 illustrated. The vehicle 10 includes at least one aerodynamic member or belly pan 90 disposed on the underbody 26 of the vehicle body 14. The at least one aerodynamic member or belly pan 90 may be integrally formed as part of the underbody 26 or may be releasably or fixedly mounted adjacent a forward portion 36 of the underbody 26.

Reducing the aerodynamic coefficient of drag on the underbody provides more freedom to exterior styling. This also increases radiator flow rates which could improve towing capabilities. To improve aerodynamic performance of the vehicle 10, the belly pan 90 may be disposed on the forward portion 36 of the underbody 26 proximate to or beneath the under-hood compartment 54, engine 58 and/or heat exchanger 60 to improve the flow path of the airflow 28 in the space 44 between the road surface 12 and body 14 of the vehicle. Implementation of a belly pan 90 solution may increase pressure in the engine bay which may reduce airflow 28 through the heat exchanger 60.

The belly pan 90 may incorporate an airflow management device 94 to improve the aerodynamic properties of the vehicle 10 and improve the cooling performance of the heat exchanger 60 in the under-hood compartment. For example, pressure may build up in the engine bay in the under-hood compartment 54, which may thereby reduce airflow 28 through the heat exchanger 60. Further, the belly pan 90 may create an improved airflow path along the central portion of the underbody 26 to further improve aerodynamics.

The belly pan 90 include a housing 92 incorporating an airflow management device, generally referenced by numeral 94. The airflow management device 94 of the belly pan 90 may cooperate with the underbody and/or other vehicle features such as the shutter system 70, to adjust airflow into the under-hood compartment 54 for operation of the vehicle 10. As shown in FIG. 4, the belly pan 90 may be adjustably positioned adjacent the forward underbody portion 36 of the underbody 26. It is understood that the airflow management device 94 may be integrally formed in the housing 92 of the belly pan 90 or assembled in the opening 99 of the housing 92.

The airflow management device 94 as shown in FIGS. 4 and 5 includes a rotatable or adjustable shutter assembly 96 that is selectively positioned and configured regulate an amount of the airflow 28 entering or flowing into the under-hood compartment 54 from the front end 16 of the vehicle 10 to improve vehicle performance. As shown, the shutter assembly 96 is positioned below and immediately adjacent to the engine 58 and heat exchanger 60 in the forward underbody portion 36 of the vehicle 10.

The shutter assembly 96 may include one or more louvers 98. Each of the plurality of louvers 98 may be configured to rotate about a pivot axis (not shown) during operation of the shutter assembly 96, thereby effectively controlling the amount of airflow 28 through the airflow management device 94 into the under-hood compartment 54 of the vehicle 10.

The shutter assembly 96 may be configured to operate between and inclusive of at least one of a fully-closed position or state as shown in FIG. 5 through an intermediate or partially-closed position and to a fully-opened position (not shown). When the one or more louvers 98 are in any of their open positions, the airflow 28 enters the under-hood compartment 54 of the vehicle 10 by penetrating the plane of shutter assembly 96 before encountering the heat exchanger 60.

In one non-limiting embodiment of the disclosure, the shutter assembly 96 of the airflow management device 94 may be operatively connected to the mechanism 86 cooperating with the shutter system 70. As with the shutter system 70, the mechanism 86 may be configured to selectively position the shutter assembly 96 and thereby select and lock a desired position of the shutter assembly 96 between and inclusive of at least a fully-opened and a fully-closed position.

The mechanism 86 may be configured to cause the one or more louvers 98 to rotate in tandem or substantially in unison, and permitting the shutter assembly 96 to rotate into any of the available positions. The mechanism 86 may further be configured to select and lock either discrete intermediate positions of the shutter assembly 72 of the shutter system 70 corresponding with the at least one grille opening 56 and the shutter assembly 96 of the airflow management device 94 or to position the louvers of the shutters in the shutter system 70 and airflow management device 94 in unison between and inclusive of at least the fully-opened and fully-closed positions. As such, the shutter assembly 72 of shutter system 70 and shutter assembly 96 of the airflow management device 94 may be adjusted by the mechanism 86 such that the airflow management device 94 is open when the shutter system 70 is open and the shutter assembly 96 of the airflow management system 94 may be fully closed when the shutter assembly 72 of shutter system 70 is fully closed.

It is also contemplated that the controller 88 may be operatively connected to one or more of the shutter system 70, mechanism 86 and/or the airflow management device 94 to position the shutter system 70 and airflow management device 94 between and inclusive of fully-opened and fully-closed positions in response to the ascertained configuration of the powertrain to establish the baseline airflow opening into the under-hood compartment 54. The fully opened positions of the shutter system 70 and/or airflow management device 94 generates maximum airflow into the under-hood compartment 54 during high load operation of any of the alternative powertrains and their respective engines 58.

Conversely, when the fully closed position for the shutter system 70 and/or airflow management device 94 is selected by the controller 88, the airflow to the under-hood compartment 54 will occur primarily through the grille opening 56 to achieve a minimum level of cooling for the high-temperature coolant 62 inside the heat exchanger 60. An intermediate, partially opened position for the shutter system 70 and/or the airflow management device 94 may also be selected and set by the controller 88. Such a partially opened position for the shutter system 70 and/or the airflow management device 94 generates an intermediate airflow rate into the under-hood compartment 54.

When the fully opened position for the shutter system 70 and/or the airflow management device 94 is selected by the controller 88, the level of cooling for the high-temperature coolant 62 may be at an absolute maximum. The fully opened position of the for the shutter system 70 and/or the airflow management device 94 combines the maximum airflow 28 to provide sufficient cooling to the engine 58 when an increased amount of heat is generated by the engine 58 during high stress operation. Accordingly, the fully opened position for the for the shutter system 70 and/or the airflow management device 94 achieves an increased level of cooling for the high-temperature coolant 62 inside the heat exchanger 60, as may be required by the cooling needs of any of the alternative engines at higher operating loads.

When the shutter system 70 and/or the airflow management device 94 are positioned in the fully-closed position by the mechanism 86 in operative communication with the control 88, the louvers 74-78 provide blockage of the airflow 28 at the grille opening 56, while the one or more louvers 98 provide blockage of the airflow 28 at the airflow management device 94. A fully-closed shutter system 70 and/or the airflow management device 94 provides optimized aerodynamics for the vehicle 10 when engine cooling through the grille opening 56 is not required. The shutter system 70 and/or the airflow management device 94 may also be operated by the controller 88 to variably restrict access of the oncoming airflow 28 to the heat exchanger 60, by rotating the louvers 74-78 of shutter assembly 72 and the one or more louvers 98 of the airflow management device 94 to an intermediate position.

In another non-limiting embodiment of the disclosure, the air flow management device 94 in the belly pan 90 may include an adjustable vane or other channeling member cooperating with the engine 58 and heat exchanger 60. The vane or channeling member may be configured to vent engine bay pressure in the under-hood compartment 54 which may thereby the airflow through the heat exchanger 60. New parts could be developed to actuate a vane or louver to vent engine bay pressure and increase radiator airflow.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A vehicle comprising:
   a vehicle body having a first end configured to face oncoming airflow when the vehicle is in motion relative to a road surface and an opposing second end;
   an under-hood compartment provided in the first end of the vehicle body;
   an internal combustion engine received in the under-hood compartment;
   a heat exchanger in fluid communication with the engine, wherein the engine is cooled by a liquid circulated through the heat exchanger;
   an underbody extending between the first and second ends of the vehicle body, the underbody including a forward portion adjacent the first end of the vehicle body, a rearward portion adjacent the second end of the vehicle body and a central portion extending therebetween;
   at least one aerodynamic member disposed adjacent the forward portion of the underbody and proximate to the under-hood compartment, the at least one aerodynamic member including a housing and an opening extending at least partially through the housing;
   an airflow management device provided in the opening and selectively positioned to direct the airflow from the front end of the vehicle into the under-hood compartment to improve vehicle performance, wherein the airflow management device includes a shutter assembly disposed in the opening in the housing of the at least one aerodynamic member;
   a mechanism operatively connected to the shutter assembly to selectively position the shutter assembly between at least a fully open position and a fully closed position; and
   a controller operatively connected to the mechanism to regulate movement of the mechanism to selectively position the shutter assembly,
   wherein the controller selectively positions the shutter assembly between at least the fully open position and the fully closed position to cool the liquid circulated through the heat exchanger based upon a load generated by the engine.

2. The vehicle of claim 1 wherein the shutter assembly includes one or more louvers selectively positioned to control a size of the opening of the housing between at least a fully open position and a fully closed position.

3. The vehicle of claim 1 further comprising:
- at least one grille opening provided in the first end of the vehicle body and cooperating with the under-hood compartment to receive the airflow; and
- a shutter assembly arranged proximate to the at least one grille opening, the shutter assembly including one or more louvers selectively positioned to control a size of the at least one grille opening between at least a fully open position and a fully closed position.

4. The vehicle of claim 3 further comprising a mechanism operatively connected to the shutter assembly cooperating with the at least one grille opening, wherein the mechanism is configured to position the shutter assembly between at least the fully open position and the fully closed position.

5. The vehicle of claim 4 wherein the mechanism operatively connected to the shutter assembly cooperating with the at least one grille opening is operatively connected to the shutter assembly of the airflow management device.

6. A system for adjusting airflow into an under-hood compartment provided in a body of a vehicle, the system comprising:
- an internal combustion engine received in the under-hood compartment;
- a heat exchanger in fluid communication with the engine, wherein the engine is cooled by a liquid circulated through the heat exchanger;
- at least one aerodynamic member disposed proximate the under-hood compartment, the at least one aerodynamic member including a housing and an opening extending at least partially through the housing;
- an airflow management device provided in the opening in the housing that is selectively positioned to direct the airflow into the under-hood compartment to improve vehicle performance, wherein the airflow management device includes a shutter assembly disposed in the opening in the housing of the at least one aerodynamic member;
- a mechanism operatively connected to the shutter assembly of the airflow management device to selectively position the shutter assembly between at least a fully open position and a fully closed position; and
- a controller operatively connected to the mechanism to regulate movement of the mechanism to selectively position the shutter assembly,
- wherein the controller selectively positions the shutter assembly between at least the fully open position and the fully closed position to cool the liquid circulated through the heat exchanger based upon a load generated by the engine.

7. The system of claim 6 wherein the shutter assembly includes one or more louvers selectively positioned to control a size of the opening of the housing between at least the fully open position and the fully closed position.

8. The system of claim 6 further comprising:
- at least one grille opening provided in the vehicle body and cooperating with the under-hood compartment to receive the airflow; and
- a shutter assembly arranged proximate to the at least one grille opening, the shutter assembly including one or more louvers selectively positioned to control a size of the at least one grille opening between at least a fully open position and a fully closed position.

9. The system of claim 8 further comprising a mechanism operatively connected to the shutter assembly cooperating with the at least one grille opening, wherein the mechanism is configured to position the shutter assembly between at least the fully open position and the fully closed position.

10. The system of claim 9 wherein the mechanism operatively connected to the shutter assembly cooperating with the at least one grille opening is operatively connected to the shutter assembly of the airflow management device.

11. The system of claim 6 wherein the controller is operatively connected to a thermostat that regulates the circulation of coolant through the heat exchanger.

12. The system of claim 6 wherein the controller is configured to operate the mechanism according to the temperature of the coolant detected by a sensor in communication with the controller.

13. The system of claim 12 wherein the controller is operatively connected to the mechanism to position the shutter assembly of the airflow management device to the fully open position for maximum airflow to increase cooling of the coolant in the heat exchanger when an increased amount of heat is detected by the sensor in response to the load generated by the engine.

14. A vehicle comprising:
- a vehicle body having a first end configured to face oncoming airflow when the vehicle is in motion relative to a road surface and an opposing second end;
- an under-hood compartment provided in the first end of the vehicle body;
- an internal combustion engine received in the under-hood compartment;
- a heat exchanger in fluid communication with the engine, wherein the engine is cooled by a liquid circulated through the heat exchanger;
- an underbody extending between the first and second ends of the vehicle body, the underbody including a forward portion adjacent the first end of the vehicle body, a rearward portion adjacent the second end of the vehicle body and a central portion extending therebetween;
- at least one grille opening provided in the first end of the vehicle body and cooperating with the under-hood compartment to receive the airflow;
- a shutter assembly arranged proximate to the at least one grille opening, the shutter assembly including one or more louvers selectively positioned to control a size of the at least one grille opening between at least a fully open position and a fully closed position;
- at least one aerodynamic member disposed adjacent the forward portion of the underbody and proximate to the under-hood compartment, the at least one aerodynamic member including a housing and an opening extending at least partially through the housing;
- a shutter assembly disposed in the opening in the housing of the at least one aerodynamic member, the shutter assembly including one or more louvers selectively positioned to control a size of the opening of the housing between at least a fully open position and a fully closed position;
- a mechanism operatively connected to the shutter assembly of the at least one grille opening and the shutter assembly of the airflow management device to selectively position each of the shutter assemblies between at least the fully open positions and the fully closed positions to direct the airflow from the front end of the vehicle into the under-hood compartment to improve vehicle performance;
- a controller operatively connected to the mechanism to regulate movement of the mechanism to selectively position the shutter assembly,
- wherein the controller selectively positions the shutter assembly of the at least one grille opening and the shutter assembly of the airflow management device between at least the fully open position and the fully closed position to cool the liquid circulated through the heat exchanger based upon a load generated by the engine.

15. The vehicle of claim 1 wherein the controller is operatively connected to a thermostat that regulates the circulation of coolant through the heat exchanger.

16. The vehicle of claim 1 wherein the controller is configured to operate the mechanism according to the temperature of the coolant detected by a sensor in communication with the controller.

17. The vehicle of claim 16 wherein the controller is operatively connected to the mechanism to position the shutter assembly of the airflow management device to the fully open position for maximum airflow to increase cooling of the coolant in the heat exchanger when an increased amount of heat is detected by the sensor in response to the load generated by the engine.

18. The vehicle of claim 14 wherein the controller is operatively connected to a thermostat that regulates the circulation of coolant through the heat exchanger.

19. The vehicle of claim 14 wherein the controller is configured to operate the mechanism according to the temperature of the coolant detected by a sensor in communication with the controller.

20. The vehicle of claim 19 wherein the controller is operatively connected to the mechanism to position the shutter assembly of the airflow management device to the fully open position for maximum airflow to increase cooling of the coolant in the heat exchanger when an increased amount of heat is detected by the sensor in response to the load generated by the engine.

* * * * *